United States Patent Office 3,826,815
Patented July 30, 1974

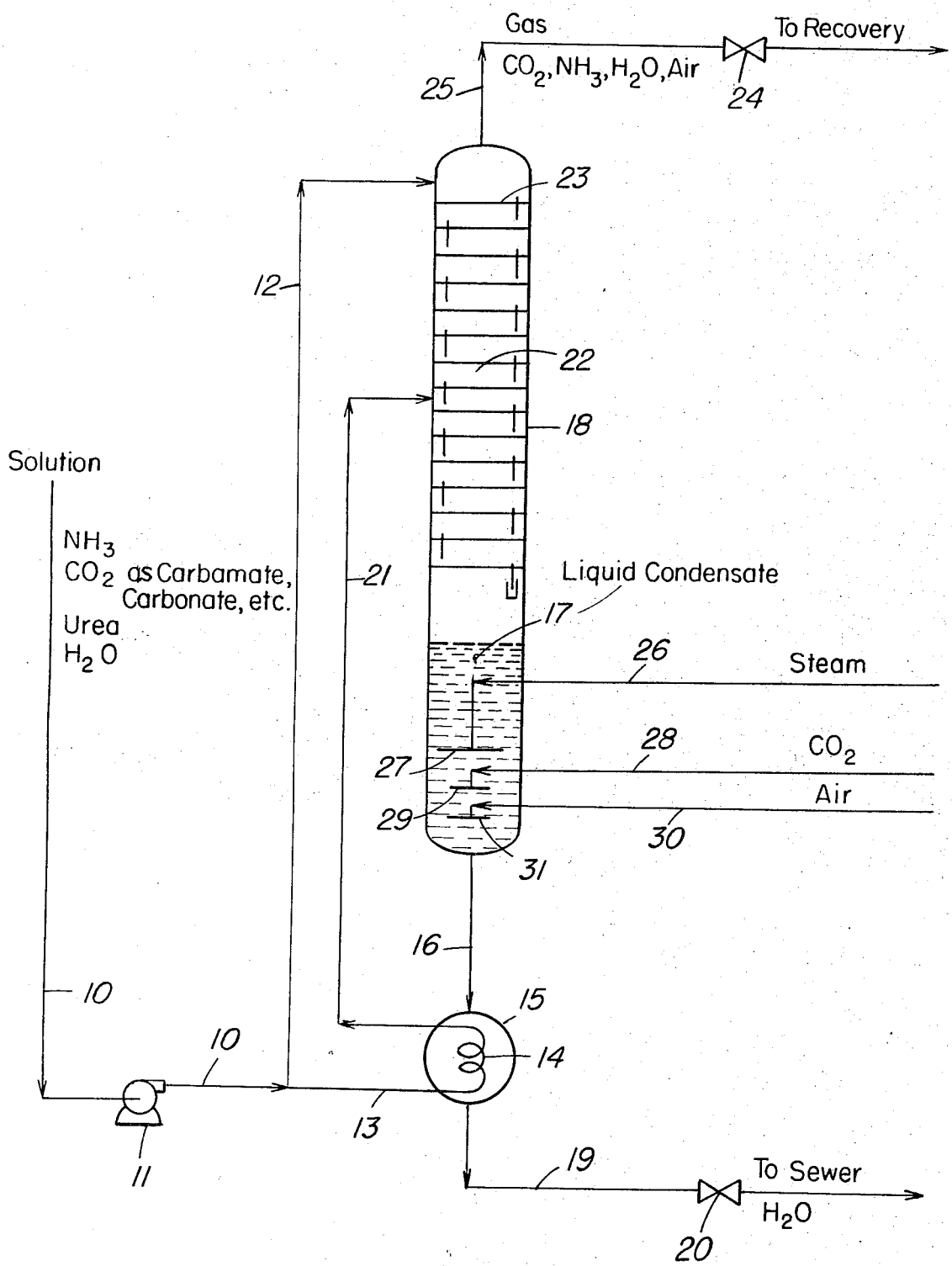

3,826,815
RECOVERY OF RESIDUAL AMMONIA FROM
WEAK AQUEOUS SOLUTIONS THEREOF
Ivo Mavrovic, 530 E. 72nd St.,
New York, N.Y. 10016
Continuation-in-part of abandoned application Ser. No. 264,885, June 21, 1972. This application Oct. 15, 1973, Ser. No. 406,499
Int. Cl. C01c 1/02
U.S. Cl. 423—356                11 Claims

ABSTRACT OF THE DISCLOSURE

Ammonia is recovered from a waste, liquid effluent comprising a weak ammoniacal aqueous solution containing ammonia and/or ammonium carbamate or ammonium carbonate by stripping the solution with steam and an inert gas in a fractionator at specified conditions. Substantially all of the ammonia is recovered in an overhead gaseous product and a bottoms liquid product which is essentially condensate substantially free of ammonia is also recovered.

RELATED APPLICATION

This application is a continuation-in-part of Ser. No. 264,885 filed June 21, 1972, and now abandoned.

This invention relates to the recovery of residual ammonia from a weak solution containing $NH_3$.

It is known that in the synthesis of urea from $NH_3$ and $CO_2$ as starting raw materials, for each two moles of $NH_3$ reacted with one mole of $CO_2$ to form one mole of urea, one mole of process water is formed in the reactor. In a subsequent step of producing solid urea from an aqueous solution thereof obtained from a synthesis section, this stoichiometric amount of process water formed in the reactor is separated from urea either by evaporation or by crystallization and invariably contains from 0.5 to 4.0 weight percent of residual $NH_3$. This poses serious problems in the waste disposal system employed and financial losses through rejection of the residual $NH_3$.

Various methods have been suggested in the past for the recovery of this residual amount of ammonia from such waste effluents before rejection to sewer. One of these known methods involves feeding such an ammoniacal process water solution into a bubble cap or sieve tray of a rectification column operating at about 20–50 p.s.i.g., steam heating the resulting bottoms directly or indirectly, and partially cooling the top section of the column to provide the proper refluxing of the solution through the tray section thereof. The ammonia expelled from the solution is removed overhead with water vapor in equilibrium with the refluxing solution. The main drawback of such a method is the fact that the bottoms discharged (as to a sewer) from such a column usually contain more than 300 p.p.m. of residual $NH_3$ in solution. The disposal of such a waste water represents a problem to the plant operator due to contamination of the surroundings with ammonia.

Another such method, described in U.S. Pat. No. 3,488,-293, discloses the use of a similar apparatus, as described above, but having the purpose of reducing the water content of a gaseous phase containing about 20–25 weight percent of $NH_3$ and about 10 to about 15 weight percent of $CO_2$ together with water vapor. Such a gaseous phase is obtained from a urea synthesis reactor effluent stream subsequent to the let down in pressure from a urea synthesis reactor. This method has several drawbacks. One consists of the fact that from such a gaseous mixture fed to the top of the rectification column, ammonium carbamate is formed on the top trays of the rectification column with a consequent relatively high corrosion rate of the stainless steel equipment in contact with the process fluid. The second is that, in order to reduce the corrosion rate of the stainless steel equipment exposed to the process, fluid oxygen must be fed to the rectification column in order to maintain the surface of the wetted parts of the equipment passivated against corrosion; however, due to the addition of this passivating oxygen and due to the fact that the gaseous phase separated from the reactor effluent stream and fed to the rectification column invariably contains various explosive gases as $H_2$, $CH_4$, etc., the operation of such a rectifier is very precarious and must be subject to careful measuring and diluting of oxygen feed with an inert gas such as $CO_2$ for instance, prior to introduction into such a rectifier in order to avoid an explosion of the apparatus.

On the contrary, according to this invention, a weak aqueous solution containing relatively small amounts of $NH_3$ (e.g. from about 0.1 to about 10 weight percent) and ammonium carbamate instead of a gaseous phase rich in $NH_3$ and $CO_2$ is fed to the rectification column. Such a weak aqueous solution is substantially free of volatile explosive gases as $H_2$ or $CH_4$ because they are separated from the liquid phase together with the remaining $NH_3$ and $CO_2$ gaseous phase in a previous step not described here, and the solution inside the rectification column is practically non-corrosive because substantially all the $CO_2$ entering the column is in the form of ammonium carbamate or ammonium carbonate and not in the form of gaseous $CO_2$ which could cause corrosion on the column internals due to reaction with $NH_3$ to ammonium carbamate or ammonium carbamate. If desired, passivating air instead of oxygen can be fed to such a rectification column without any danger of explosions.

Inasmuch, it has been found that by adding an inert gas, preferably $CO_2$, to the bottom section of such a rectification column the ammonia content in the waste water collected in the bottom section of the rectifier and rejected to sewer can be reduced well below 20 p.p.m. without incurring corrosion problems of the rectifier internals.

Advantages attained with this method include: $NH_3$ is recovered very economically from weak ammoniacal aqueous solutions; corrosion problems of the rectifier internals and explosion hazards are eliminated, and the process water is rejected from the system with a practically undectectable residual ammonia content and well below 20 p.p.m., thus eliminating the effluent waste disposal problem.

In accordance with this invention, there is provided a process wherein ammonia gas with a relatively low moisture content is recovered from such aqueous solutions by steam stripping and $CO_2$ stripping at medium pressures between from about 20 p.s.i.g. to about 400 p.s.i.g. in a bubble cap or sieve tray column, and the remaining purified liquid phase with a relatively low content of total ammonia of about 4–5 parts per million (p.p.m.) is also recovered. The $NH_3$ can be present in solution in one or more of the following forms: free dissolved ammonia, ammonium carbonate or bicarbonate, ammonium carbamate, urea, etc.

The attached drawing illustrates schematically apparatus usable in one embodiment of the invention.

Referring to the figure, solution in line 10 contains about 2 weight percent $NH_3$, about 1 weight percent $CO_2$ as ammonium carbamate and/or carbonate, about 0.5 weight percent urea and about 96.5 weight percent $H_2O$. The solution in line 10 can be withdrawn, for example, from the hotwell of a vacuum surface condenser of a crystallizer (not shown), in which urea solution is crystallized under vacuum to form urea crystals and mother liquor. The water evaporated under vacuum in the crystallizer carries over small amounts of urea mist and mother liquor, together with residual ammonia and carbon dioxide originally present in the urea solution fed to the crystallizer for processing. The solution in line 10, at about 120° F. for example, is elevated in pressure by means of pump 11 to about 150 p.s.i.g. and is divided into two streams, 12 and 13, in an approximate ratio of about 1:4, respectively. Stream 13 is passed through tubes 14 of economizer 15 in indirect heat exchange with stream 16. The latter is withdrawn from bottom section 17 of recovery stripper 18 at about 370° F., or more precisely at the temperature at which water condensate boils at the pressure prevailing in the bottom section 17 of recovery stripper 18. In economizer 15, stream 13 is heated to about 320° F. and stream 16 is cooled to about 150° F. Stream 16 is discharged to sewer through line 19 and valve 20. The latter serves to maintain a constant level of condensate in the bottom section 17 of recovery stripper 18.

The heated stream 13 is passed through line 21 and is introduced approximately into the midsection of the bubble cap or sieve tray section 22 of recovery stripper 18.

If economizer 15 is omitted, lines 13 and 21 are also omitted and stream 10 is not split into two streams. Instead stream 10 is fed in its entirety to top tray 23 of tray section 22 through line 12, and the relatively hot stream 16 is discharged to sewer through line 19 without heat recovery.

The pressure inside recovery stripper 18 is maintained at about 150 p.s.i.g., and is controlled by means of valve 24 located on overhead line 25. The recovery stripper 18 can be operated within the pressure range of from about 20 to about 400 p.s.i.g. with desired results. The solution from lines 12 and 21 is heated inside the tray section 22 of recovery stripper 18 in countercurrent contact with an uprising gaseous stream substantially containing $NH_3$, $CO_2$ and water vapor. Water vapor condenses out from the gaseous phase and provides on the trays the major part of heat required to heat the downcoming solution. Practically all of the ammonia originally contained in stream 10 is expelled from the liquid phase in stripper 18 due to heating and countercurrent stripping with the uprising gas. The urea originally contained in stream 10 is hydrolyzed to ammonium carbamate in the tray section 22 and in the bottom section 17. The ammonium carbamate is decomposed to gaseous $NH_3$ and $CO_2$, and these gases are stripped from the liquid phase in stripper 18.

The equivalent amount of heat required to decompose carbamate to $NH_3$ and to $CO_2$ and to strip the gases from the liquid phase is supplied to the recovery stripper 18 by means of steam preferably passed through line 26 and distributed through steam sparger 27 immersed in the liquid phase collected in the bottom section 17. The steam is saturated and flows through the liquid phase to function as a stripping agent for the residual $NH_3$ dissolved in the liquid phase of bottom section 17 and tray section 22. Instead of feeding live steam to the bottom section 17, heat can be supplied to recovery stripper 18 by indirectly condensing steam in a coil (not shown) immersed in the liquid phase in bottom section.

$CO_2$ gas is supplied to the bottom section 17 through line 28 and through spacer 29 immersed into the liquid phase of bottom section 17 and is preferably positioned under steam sparger 27.

If recovery stripper 18 and its internals exposed to the mildly corrosive action of the refluxing solution therein is made of stainless steel, a small amount of air (or oxygen) is optionally introduced into the bottom section 17 of recovery stripper 18 to passivate the stainless steel. The amount of air (or oxygen) used is equivalent to from about 0.1 to about 5 moles of oxygen per 100 moles of carbon dioxide present in line 25. The air (or oxygen) is introduced through line 30 and through sparger 31 immersed into the liquid phase. The sparger is preferably positioned below spargers 27 and 29.

The stripped gas, containing $NH_3$, $CO_2$, water vapor and air and flowing upwardly through recovery stripper 18, is discharged overhead from stripper 18 through line 25 for recovery in another section, not shown.

The liquid discharged to sewer from recovery stripper 18 through line 19 is substantially all condensate and contains only about 4–5 p.p.m. of total residual ammonia as free $NH_3$ and ammonia fixed either as carbamate or as urea.

The amount of inert gas so charged to the stripper through line 28 can be varied from about 0.1 mole to about 10 moles of inert per mole of ammonia is free ammonia dissolved in water, ammonia fixed in ammonium carbamate, ammonium carbonate, ammonium bicarbonate, urea or a mixture thereof. With $CO_2$ as the preferred inert, preferred operation is with from about 0.5 to about 2 moles of $CO_2$ per mole of ammonia, as defined in the charge; and with an inert other than $CO_2$, the preferred range is from about 3 to about 6 moles.

I claim:

1. A process for the recovery of ammonia from an aqueous solution substantially free of free $CO_2$ and containing from about 0.1 to about 10 percent by weight of ammonia in one or more of the following forms: free ammonia dissolved in water, ammonia fixed in ammonium carbamate, ammonium carbonate, ammonium bicarbonate, urea, and mixtures thereof, which comprises:
    passing said aqueous solution into an upper section of a fractionating column,
    passing said aqueous solution into an upper section of said fractionating column and stripping ammonia from said aqueous solution therewith at a pressure of from about 20 to about 400 p.s.i.g., the amount of said inert gas so passed being from about 0.1 mole to about 10 moles of inert per mole of ammonia as free ammonia dissolved in water, ammonia fixed in ammonium carbamate, ammonium carbonate, ammonium bicarbonate, urea or a mixture thereof,
    withdrawing from said column an overhead product containing said ammonia, inert gas and water vapor, and
    withdrawing from said column a liquid product which is essentially liquid condensate substantially free of ammonia fixed either as ammonium carbamate, carbonate, bicarbonate, or urea, or as free ammonia.

2. The process of Claim 1, wherein said aqueous solution contains urea and ammonium carbamate.

3. The process of Claim 1, wherein the inert gas is carbon dioxide.

4. The process of Claim 3, wherein the carbon dioxide and steam are introduced separately into said column.

5. The process of Claim 3, wherein the carbon dioxide is introduced into said column separately below the steam.

6. The process of Claim 3, wherein oxygen is introduced into a lower section of said column in an amount of from about 0.1 to about 5 moles of oxygen per 100 moles of carbon dioxide present in said overhead product.

7. The process of Claim 6, wherein oxygen is so introduced below said carbon dioxide and steam.

8. The process of Claim 6, wherein the oxygen is in the form of air.

9. The process of Claim 1, wherein a minor part of said aqueous solution is introduced into an upper section of said column and a major portion of said aqueous solution is heated and introduced into an intermediate section of said column.

10. The process of Claim 1, wherein said major portion of said solution before being introduced into said column, is in indirect heat exchange with said liquid product.

11. The process of Claim 1, wherein the inert gas is carbon dioxide and the amount thereof is from about 0.5 to about 2 moles per mole of ammonia as free ammonia dissolved in water, ammonia fixed in ammonium carbamate, ammonium carbonate, ammonium bicarbonate, urea or a mixture thereof.

References Cited
UNITED STATES PATENTS

| | | | |
|---|---|---|---|
| 2,012,621 | 8/1935 | Bennett | 423—356 |
| 3,428,426 | 2/1969 | Carney et al. | 423—356 |
| 3,488,293 | 1/1970 | Hong et al. | 252—372 |

OSCAR R. VERTIZ, Primary Examiner

H. S. MILLER, Assistant Examiner

UNITED STATES PATENT OFFICE
CERTIFICATE OF CORRECTION

Patent No. 3,826,815  Dated July 30, 1974

Inventor(s) IVO MAVROVIC

It is certified that error appears in the above-identified patent and that said Letters Patent are hereby corrected as shown below:

Column 4, line 21 - "is" should be "as".

Column 4, line 39 - Claim 1 - delete "passing said aqueous solution into an upper" and replace with ---passing steam and an inert gas into a lower---.

Signed and sealed this 12th day of November 1974.

(SEAL)
Attest:

McCOY M. GIBSON JR.　　　　　　　　C. MARSHALL DANN
Attesting Officer　　　　　　　　　Commissioner of Patents